(12) United States Patent
Kossik et al.

(10) Patent No.: US 6,336,561 B1
(45) Date of Patent: Jan. 8, 2002

(54) DISPOSABLE ROTARY DRUM FILTER

(76) Inventors: John Michael Kossik, 16511 4th Dr. SE., Mill Creek, WA (US) 98012; Jeff F. Delys, 9618 58th Pl. W., Mukilteo, WA (US) 98275

(*) Notice: Subject to any disclaimer, the term of this patent is extended or adjusted under 35 U.S.C. 154(b) by 0 days.

(21) Appl. No.: 09/580,366

(22) Filed: May 26, 2000

Related U.S. Application Data

(60) Provisional application No. 60/138,863, filed on Jun. 11, 1999.

(51) Int. Cl.[7] ......................... B01D 33/06; B01D 33/073
(52) U.S. Cl. ....................... 210/396; 210/402; 210/406; 210/416.1
(58) Field of Search ................................ 210/396, 402, 210/406, 416.1

(56) References Cited

U.S. PATENT DOCUMENTS

| | | | | |
|---|---|---|---|---|
| 3,635,341 A | * | 1/1972 | Davis | 210/402 |
| 3,794,178 A | | 2/1974 | Luthi | 210/404 |
| 3,837,499 A | | 9/1974 | Luthi | 210/404 |
| 3,894,899 A | | 7/1975 | Konopatov et al. | 156/187 |
| 4,157,301 A | | 6/1979 | Wegener | 210/404 |
| 4,346,008 A | | 8/1982 | Leighton et al. | 210/395 |
| 4,419,165 A | | 12/1983 | LaValley | 156/245 |
| 4,515,693 A | | 5/1985 | Luthi | 210/402 |
| 4,702,845 A | | 10/1987 | Wykoff | 210/784 |
| 5,055,205 A | | 10/1991 | White | 210/784 |
| 5,130,021 A | | 7/1992 | Pierson | 210/399 |
| 5,244,572 A | | 9/1993 | McAllister | 210/402 |
| 5,262,069 A | | 11/1993 | Kato | 210/777 |
| 5,308,488 A | | 5/1994 | Nelson | 210/404 |
| 5,954,960 A | | 9/1999 | Nagaoka et al. | 210/402 |

\* cited by examiner

Primary Examiner—David A. Reifsnyder

(57) ABSTRACT

A disposable rotary drum filter for processing batches of slurry. The device includes an outer housing in which is disposed a rotatable inner drum that is covered with a filter material. Preferably the device is fabricated from a plastic material that is sterilizable. The inner drum is preferably magnetically coupled to an external drive unit, eliminating seals required if it were necessary for a drive shaft to pass through the housing. The inner drum rotates through a slurry. The filtrate outlet is connected to a vacuum source that draws the slurry through the filter material. Solids in the slurry are thus deposited as a filter cake on the outer surface of the filter material, while liquid from the slurry passes through the filter material to be collected as a filtrate. Air drawn into the housing through an inlet passes through the filter material and partially dries the filter cake that has been rotated out of the slurry. As the inner drum rotates, an edge formed on the housing scrapes away a portion of the filter cake, which falls into a filter cake receiver. A simple overflow outlet level limits the slurry level to a defined maximum, and an orifice formed in a fixed plate disposed in a cavity at one end of the inner drum controls pressure conditions within the device to ensure optimal fluid flow. The device is thus useful for solid-liquid separations in batch processing of many types of slurries and can be sterilized, if required.

55 Claims, 6 Drawing Sheets

DISPOSABLE ROTARY DRUM FILTER

RELATED APPLICATIONS

This application is based on prior copending U.S. provisional patent application Ser. No. 60/138,863, filed Jun. 11, 1999, the benefit of the filing date of which is hereby claimed under 35 U.S.C. §119(e).

FIELD OF THE INVENTION

The present invention is generally directed to rotary drum filters, and more specifically, to disposable rotary drum filters for batch processing.

BACKGROUND OF THE INVENTION

In the pharmaceutical, fine chemical, hazardous material, beverage, juice, wine, and beer industries, most of the production processes are inherently batch processes. Batch processing, rather than continuous flow processing, is advantageous when a limited volume of material is to be processed, when there is a need for traceable "lots" of product, and/or when the intrinsic value of the product is high. A common process step in both batch and continuous flow processing is the separation of solids from liquids.

Traditionally, solid-liquid separation for batch processing has been carried out using centrifuges, gravity filtration, vacuum filtration, and/or pressure filtration equipment. Although such equipment has been used for years, there are inherent disadvantages to its use, especially when employed in laboratory, pilot plant, or other small volume applications where time and resources are limited, and for processes in which it is critical that the materials be isolated from the outside environment.

For example, centrifuges are often relatively expensive, require significant maintenance, and are labor intensive to operate under aseptic or "clean" conditions. Other types of conventional batch type filtration equipment can also be expensive and similarly require a high degree of operator attendance. A further inherent problem with prior art batch filtration units is that the designs of small batch volume filtration units are often radically different than the designs of larger batch volume equipment, making the results of scaling up from laboratory or pilot plant volume production to industrial scale production less predictable.

An additional drawback with the use of centrifuges and other batch filtration units in the laboratory and pilot plant environments is that cleaning these units between batches requires considerable time and labor. Frequently, time and technical manpower resources in laboratory and pilot plant environments are at a premium, and such cleaning operations can become an unacceptable bottleneck. These cleaning operations also introduce an element of risk, both in terms of exposing personnel to potentially hazardous materials, and in terms of introducing contaminates into the processing equipment that may degrade the quality of, or even completely ruin, the next batch to be processed.

Thus, it would be desirable to provide efficient means to separate solids and liquids that is usable in batch processing, and which does not require time consuming cleaning procedures between processing batches. To eliminate the requirement for cleaning, it would be preferable if such means were sufficiently low cost as to be disposable, so that a new unit could be used for each batch of material processed.

A common non-disposable device used for solid-liquid phase separation for continuous flow processing is the rotary drum filtration unit. In fact, the rotary drum vacuum filter is considered to be the workhorse of the chemical process industry. In this type of filter, a drum that is partially submerged in a trough of suspended solids rotates slowly at only a few revolutions per minute (RPM). Solids adhere to the outer surface of the drum, which may be coated to aid in the collection of the solids. The slow rotational speed of the drum, as well as air flow over the portion of the drum that is not submerged, help to dry the solids adhering to the drum. This solid filtrate is then removed from the rotating drum, often by a blade that scrapes the collected solids from the drum. While efficient, such units are generally quite large and expensive. Consequently, they have been used primarily in association with large-scale continuous flow processing, such as for wastewater treatment. In view of the operating efficiencies of this type of device, it would be desirable to provide a much smaller and substantially lower cost disposable filtration unit that operates according to the principles of rotary drum filtration, but which can be used for batch processing in place of the traditional centrifuges and other batch filtering units.

Preferably, such a batch filtration disposable rotary drum filter should be capable of running continuously, in a steady state fashion for a period of time sufficient to process a batch of product, enabling the device to be very small as compared to conventional types of batch equipment that would normally be employed to handle the same amount of material. It would also be desirable to provide a unit that is enclosed, to minimize the risk of product and personnel contamination. It would further be desirable to fabricate such a unit from inexpensive plastic materials that can be sterilized if a process requires that sterile equipment be used. Disposability offers the advantages of eliminating clean up, containing any hazardous materials used within the disposed device, reducing the chances of product contamination, and enhancing reliability and reproducibility.

Typical conventional rotary drum filters do not provide these desirable features. Prior art rotary drum filters are relatively complicated mechanical constructions and not readily adaptable to be mass produced in quantity and at low cost for use as a disposable unit. Specifically, prior art rotary drum filters often include complicated float valves to control the level of slurry in the trough in which the drum rotates, as well as complicated valves to control pressure in the system to ensure the proper flow of fluid into the filter unit. Because of the relatively large size of prior art rotary drum filters, and the fact that such units are designed to have very substantial service lives, such units have often incorporated relatively expensive bearing and seal components. In contrast, it would be desirable to provide a disposable rotary drum filter that replaces these mechanically complicated float control and pressure control schemes in the prior art with control means that are similarly effective, yet much simpler, lower cost, and more appropriate for a disposable unit. It would further be desirable to provide a disposable rotary drum filter that does not require expensive bearing and seal components.

Examples of prior art designs of a typical rotary drum filter include those described in U.S. Pat. Nos. 3,794,178; 3,837,499; 4,157,301; 4,346,008; 5,055,205; 5,244,572; 5,262,069; and 5,308,488. The configurations shown in these patents typically were created to optimize high production rates, to provide long service life, and with minimal concern about product loss due to retention of the product in the filters. While plastic and fiberglass have been used in the design of rotary drum filters (see U.S. Pat. Nos. 3,894,899; 4,419,165; and 4,515,693) to enable the processing of corrosive products, such rotary drum filters are not suitable for use in a single batch process as a disposable unit.

It would be therefore desirable to provide a rotary drum filter unit designed to process a batch of material, and then be replaced with a new unit for the next batch. Preferably, such a rotary drum filter would be engineered such that its fabrication costs are low and its operation is very simple. It would be desirable to provide a rotary drum filter made from plastic and encased in a plastic housing. Preferably, the unit should be relatively small, especially as compared with traditional rotary drum filters, and made from relatively inexpensive materials, such that it is practical for a single-use, and can be economically considered a disposable unit.

A desirable feature of such a single-use device would be the elimination of traditional seals and other isolation mechanisms. To further simplify the disposable unit, it would be desirable to eliminate internal prime movers and to instead rotate the inner drum using an external prime mover that is not part of the disposable component. In addition, seals associated with a drive shaft that penetrates the filter's outer housing should preferably be eliminated by magnetic coupling of the external prime mover to an internal drive shaft. Prior art rotary filter units generally cannot employ a magnetic coupled drive, because the size of such units it too great and the magnetic coupling is incapable of providing the required torque. In contrast, a small, disposable rotary drum filter can make use of a magnetic drive because of the relatively low torque required to rotate the smaller sized device. It would further be desirable to replace the often complicated, adjustable-position metallic sharp edge of prior art rotary drum filters with a simple fixed plastic "sharp" edge that is formed integral to the housing, to remove solids from the drum. The prior art does not disclose or suggest such an apparatus.

SUMMARY OF THE INVENTION

In accord with the present invention, a disposable rotary drum filter is defined, which is useful for separating a slurry into a liquid filtrate and a solid filter cake. The disposable rotary drum filter includes a housing defining a slurry reservoir. The housing includes a slurry inlet adapted to receive a slurry into the slurry reservoir, a gas inlet adapted to receive gas into the housing, a filtrate outlet adapted to convey filtrate from the housing after the filtrate has been separated from the filter cake, a filter cake outlet adapted to convey the filter cake from the housing, and an overflow outlet. The overflow outlet is disposed within the housing and has an opening disposed at an elevation selected to determine a maximum level of a slurry within the slurry reservoir. An inner drum is rotatably mounted within the housing and includes a generally cylindrical frame. In addition, the inner drum includes a filter extending around the frame and is disposed within the housing such that the filter is partially below the level determined by the opening of the overflow outlet. The filter is adapted to receive a filter cake that is deposited on an outer surface of the filter as filtrate separated from the filter cake is drawn through the filter and the filtrate outlet. A portion of the frame provides fluid communication between an interior surface of the filter and the filtrate outlet and is thereby adapted to convey the filtrate from the inner drum after the filtrate has passed though said filter. A driven member is connected to the frame and is adapted to be drivingly coupled to an external prime mover to rotate the inner drum, exposing the filter cake deposited on the filter to gas that is drawn through the filter into the inner drum from inside the housing. This flow of gas through the filter cake at least partially dries it. Also included within the device are means for removing at least a portion of the filter cake deposited on said filter after the filter cake has been at least partially dried by the gas. The filter cake that is thus removed passes through said filter cake outlet.

The slurry inlet is preferably disposed at a bottom of the housing and adapted to couple to a fluid line that conveys the slurry from an outlet of a slurry pump. Also, the slurry reservoir is preferably disposed in a lower portion of the housing, such that said inner drum is partially disposed within the slurry reservoir.

Also included in the housing is a journal that supports the inner drum so as to enable the internal drum to freely rotate about its longitudinal axis. A spring is provided to exert a biasing force to position the inner drum at a desired location along its longitudinal axis, within the housing. This spring is preferably disposed between the driven member and the housing. In one embodiment, the driven member is magnetically coupled to a driving member, and a magnetic force is used to provide a biasing force to similarly position the inner drum at a desired location along its longitudinal axis, within the housing, thus eliminating the need for a spring.

In one preferred embodiment, the filter cake outlet is oriented vertically, such that a gravitational force facilitates the removal of the filter cake from the housing. In this embodiment, the filter cake outlet is elongate and is disposed along one side of the housing, extending generally in alignment with the outer surface of the filter.

The means for removing at least the portion of the filter cake preferably comprises an elongate edge formed in the housing. This edge extends adjacent to the outer surface of the filter.

The filtrate outlet is preferably adapted to couple to a fluid line connected with a vacuum source.

The filter may comprise a plastic mesh screen having a plurality of openings sized to enable the filtrate to pass therethrough. However, the openings are sized to block passage of the solids comprising the filter cake. In one preferred embodiment, the filter is fabricated from a porous plastic material, whose openings are similarly sized to block passage of the solids.

In a preferred embodiment, the gas inlet is disposed in an upper part of the housing. Pressure control means are included for equalizing a pressure drop within the housing as the gas within the housing is drawn into the inner drum through the filter. The pressure control means include an orifice through which gas flowing through the filtrate outlet is drawn. This orifice is preferably formed in a plate disposed adjacent to the filtrate outlet. A fluid flow through the filter is optimized by selecting an appropriate size of the orifice in the plate.

A plurality of fluid channels in fluid communication with said filtrate outlet are provided on the inner drum. Also included are a plurality of filtrate tubes in fluid communication with said filtrate outlet. The plurality of filtrate tubes connect the longitudinal fluid channels in fluid communication with the cavity, thereby establishing a fluid path between the longitudinal channels and the filtrate outlet.

A plate separates the cavity into an upper portion and a lower portion. The plate is fixedly attached to the housing, with the inner drum being free to rotate about the plate. An orifice controls a gas flow between the upper portion and the lower portion of the cavity and thereby controls gas flow through the filter from inside the housing.

The driven member comprises a shaft that is adapted to magnetically couple to an external prime mover. At least one permanent magnet is included on the shaft, and more preferably, a plurality of permanent magnets are disposed in a spaced-apart array around an end of the shaft. In one embodiment a magnetic material (such as iron), rather than a magnet, is incorporated on the shaft.

The device can include an external coupling hub adapted to be drivingly connected to a prime mover. In this case, the driven member is magnetically coupled to the external hub, which preferably includes at least one magnet or at least one electromagnet.

The means to remove the filter cake preferably comprises a generally sharp edge and has a length that is substantially equal to that of said inner drum, being formed as an integral part of the housing. Other means to remove the filter cake from the rotating drum include serpentine belts, bursts of compressed gas or air, or an additional, smaller rotating drum (roller discharge).

In some applications, the device must be sterile. For such applications, the housing is fabricated from a material that can be readily sterilized, e.g., using ethylene oxide, steam, gamma radiation, electron beam radiation, or light.

Another aspect of the present invention is directed to a method for using a disposable rotary drum filter to process a batch of slurry. The method includes steps generally consistent with the functions of the elements included in the apparatus described above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF A PREFERRED EMBODIMENT

Overview of the Present Invention

The present invention employs filtering concepts developed for use in continuous processing environments and adapts them for use in a batch processing environment. As noted above in the Background of the Invention, rotary drum filters are devices very commonly used in the chemical process industry for continuous processing, when it is necessary to separate slurries into a filter cake fraction and a filtrate fraction. Rotary drum filters are traditionally massive units fabricated from cast iron and other heavy structural materials, and are traditionally employed in high volume applications. The present invention employs the basic operating principles of rotary drum filters in a compact unit made from non-traditional lightweight materials, such as injection molded plastic, to provide a disposable rotary drum filter that is ideally suited for use in batch processing environments.

As used herein in the specification and in the claims that follow, the term "continuous processing" refers to a processing environment in which a continuous stream of material is processed without interruption, generally over a relatively long period of time, measured, for example, in terms of days or weeks. The continuous process is generally interrupted only for maintaining the processing equipment, and not because the supply of material being treated has been exhausted. In contrast, the term "batch processing" as used herein refers to a processing environment in which a finite volume of material is processed without interruption, but only until the supply of material is exhausted, in a period of time that is relatively short, and generally measurable in terms of minutes or hours. Furthermore, the term "magnetic material" as used herein and in the claims that follow is intended to mean a material, such as a ferrous material, that is characterized by its ability to be attracted by a magnet. Also, it should be noted that in reference to the Figures, when appropriate, lines with arrows have been used to indicate the direction of a material flow, or to indicate a direction of rotation.

Details of a Preferred Embodiment

Figure 1:
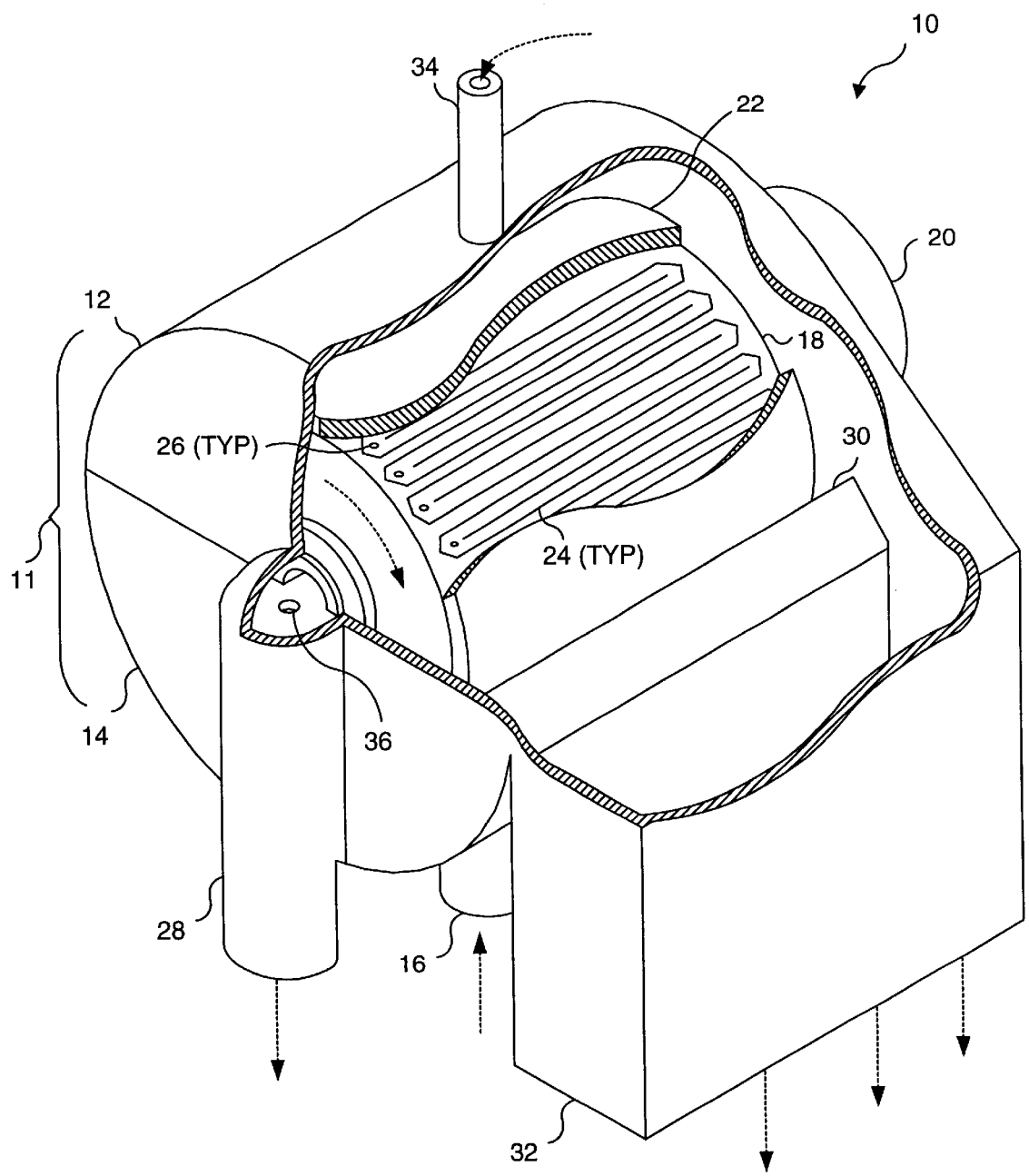
FIG. 1 is a schematic view of a disposable rotary drum filter in accord with one preferred embodiment of the present invention, a portion of the housing and of an internal filter being cut away to more clearly show interior details of the device.

FIG. 1 illustrates one preferred embodiment of the present invention in which an enclosed disposable drum filter 10 has a rotatably mounted inner drum 18 encased within an outer plastic housing 11. Housing 11 includes an upper housing 12 and a lower housing 14, which are preferably fabricated from injection molded plastic, such that the upper and lower housing can be easily assembled and joined using a suitable adhesive, plastic welding, fasteners, or other techniques commonly employed for joining plastic components in a sealed relationship. Those of ordinary skill in the art will readily appreciate that a number of well-known plastic molding and assembly techniques can be used to fabricate and join upper housing 12 to lower housing 14. It should also be noted that housing 11 can be fabricated from more than two sections, or rather than being fabricated from an upper and lower section, housing 11 can be fabricated from a right hand and left hand section. In the preferred embodiment, two sections are used to reduce the complexity, cost, and labor to assemble the unit, since an important object of the present invention is to provide an economical, simple and disposable rotary drum filter. Furthermore, using an upper and a lower section, rather than a right hand and a left hand section, ensures that the lower portion of housing 11, in which a level of slurry is accumulated sufficient to at least partially bathe inner drum 18, will not include a seam or joint (that could leak).

Many different types of plastic materials can be used to fabricate housing 11. Because the rotary drum filter 10 is intended to be small, in comparison to the traditional industrial scale, rotary drum filters of the prior art designed for continuous processing, a wide range of plastic materials will provide sufficient structural integrity. While high grade plastic materials such as fiber reinforced products can be used, it may be preferable to use lower cost plastics to minimize the cost of rotary drum filter 10. The rotary drum filter in accord with the present invention is intended to process a batch of slurry and then be discarded, so relatively inexpensive plastic can be used in fabricating it.

In one embodiment, inner drum 18 is approximately the size and shape of a common 12 oz. soft drink beverage can. At such a scale, the structural demands placed on the material are very modest, and it is envisioned that cost will be a primary consideration in choosing the material. It is expected that the thickness of the plastic components used in constructing rotary drum filter 10 will likely far exceed that required for the structural integrity of the device, when operating under its normal intended processing conditions.

It should be noted that plastics exhibit very good resistance to a wide variety of chemicals. For certain applications, it may be necessary to select a particular type of plastic based upon its resistance to a particular component in a given slurry that will be processed. Those of ordinary skill in the art will readily recognize that plastic materials suitable for fabrication of rotary drum filter 10 can be selected to exhibit good resistance to a particular class of chemicals.

In a typical application of the present invention, a slurry is pumped into rotary drum filter 10, for example, using a peristaltic pump, through a slurry inlet 16. The slurry substantially fills lower housing 14, at least to a maximum level determined by the elevation of the lower edge of the opening into an overflow outlet 40 (shown in FIG. 2), so that inner drum 18 is partially immersed in the slurry. Any excess of the slurry simply flows out of the housing through overflow outlet 40 and is typically returned to the source of the slurry by gravity flow.

Because rotary filter drum 10 is designed to be disposable, no prime mover is included within the unit. Instead, an external drive coupling hub 20 enables a prime mover (not shown) to be magnetically drivingly coupled to inner drum 18. Preferably drive coupling hub 20 includes a plurality of circumferentially spaced-apart permanent magnets 23 (shown in FIG. 2) that are magnetically coupled to corresponding magnets 43 (also shown in FIG. 2) disposed on a shaft 42 of inner drum 18. Further details of drive coupling hub 20 are provided below.

The outer surface of inner drum 18 is a filter 22, which is fabricated from a porous plastic fabric, plastic mesh, or other porous membrane. Those of ordinary skill in the art will readily recognize that a wide variety of different porous materials can be used to fabricate filter 22, and the choice will be made primarily based upon the size and quantity of the porous openings in the material, which must permit the liquid fraction of the slurry to pass through, while blocking the solid fraction. Again, because rotary drum filter 10 is intended to be a low cost, single use, disposable unit, cost is also expected to drive the selection of material. Note that filter 22 does not need to be made of a long-lasting material. Instead, it is sufficient that the material selected have a service life at least exceeding that required to process a batch of slurry. Filter 22 forms a base upon which a filter cake is formed when disposable rotary drum filter 10 is in operation.

Filter 22 preferably is fabricated from a material that can withstand sterilization procedures, so that disposable rotary drum filter 10 can be sterilized before use if a user so desires. It is also important for the filter material to be chemically compatible with the slurry to be filtered. With respect to plastic based filter materials, those of ordinary skill in the art will recognize that plastic materials are naturally hydrophobic (water repelling), and can be treated with an appropriate material, if a hydrophilic (water absorbing) characteristic is required.

In one embodiment, a plastic mesh fabricated with the required mesh opening size will likely provide the required characteristics of low cost, appropriate service life, and appropriate porosity. In another embodiment the filter is preferably fabricated from a porous plastic material. Such materials are readily available in several different forms, including High-Density Polyethylene (HDPE), Ultra-High Molecular Weight Polyethylene (UHMW), Polypropylene (PP), Polyvinylidene Fluoride (PVDF), Polytetrafluoroethylene (PTFE), Nylon 6 (N6), Polyethersulfone (PES), and Ethyl Vinyl Acetate (EVA), from Porex Technologies of Fairburn, GA Porous plastics are readily available in different pore sizes, so that the pore size of a particular filter can be matched with the size of the solids in a slurry to ensure that good filtration of the solids is achieved. Empirical testing has indicated that a porous plastic material having a pore size of 20 microns is well suited to filtering a diatomaceous earth slurry.

One advantage of a porous plastic over a fine plastic mesh is that the porous plastic is a self supporting material. Prior art rotary drum filters have typically required complicated support structures for fabric or mesh filters that do not have sufficient structural rigidity to be self-supporting. Porous plastics are available in sheet form, from which a generally tubular filter can be fabricated by welding opposite ends of the sheet together to form a tube. Porous plastics are also available in tubes of various sizes. A generally tubular porous plastic filter of the appropriate size is well adapted to provide a self supporting filter 22 when placed over the outer surface of inner drum 18. Liquid passing through filter 22 enters a plurality of fluid channels 24 formed on the surface of inner drum 18 and extending longitudinally just behind the filter material. The filtered liquid (i.e., the filtrate) that is inside fluid channels 24 flows into orifices 26, one orifice being provided proximate one end of each fluid channel. Orifices 26 are in fluid communication with a filtrate discharge 28, through which the filtrate is discharged, as will be described in further detail below in connection with the discussion of FIGS. 5 and 7. A gas inlet 34 is included at the top of upper housing 12 to enable sufficient air to enter disposable rotary drum filter 10 to make up for air exiting with the filtrate through filtrate discharge 28. It should be noted that while the gas entering through gas inlet 34 will often be ambient or filtered air, other gases, such as nitrogen from a compressed gas supply, can alternatively be used. An orifice 36 functions as a pressure control, ensuring that pressure levels within the unit maintain a required flow of filtrate from the device. Further details regarding the operation of disposable rotary drum filter 10 and the flow of fluids through the device are provided below.

The filter cake that is formed on filter 22 as the liquid fraction passes through filter 22 is removed by an edge 30, which is preferably formed extending longitudinally along the inner side of a filter cake discharge 32, which is integrally formed on lower housing 14. In the preferred embodiment, edge 30 is preferably not adjustable to set the distance it is spaced apart from the filter, as any mechanism required to provide a positionable edge would slightly increase the complexity and cost of the design. Edge 30 is disposed sufficiently close to inner drum 18 to ensure that the mass of filter cake deposited on filter 22 does not negatively impact the rotation of inner drum 18. It is contemplated that the disposition or spacing of edge 30 relative to inner drum 18 will be varied in different production models of the present invention. For instance, a rotary drum filter that is optimized to filter a suspended solid that is characterized as being extremely dense will preferably have a separation distance between edge 30 and inner drum 18 that is less than that for a rotary drum filter optimized to filter a suspended solid that is characterized as having a low density. In this embodiment in which inner drum 18 is approximately the size of a 12 oz. beverage can, empirical data indicates that a separation distance of approximately ⅛ of an inch is effective for a wide variety of different slurries. Filter cake that is removed from filter 22 by edge 30 exits rotary drum filter 10 through filter cake discharge 32. Note that instead of being provided as an integral part of lower housing 14, edge 30 could be fabricated as a separate component that is secured to the housing with a suitable adhesive or with suitable fasteners. However, fabricating edge 30 as an integral part of lower housing 14 will help to achieve lower production costs, ensuring that a cost effective disposable unit is achieved.

Edge 30 is not required to be particularly "sharp." Prior art rotary drum filters often employ an edge element to remove filter cake from the surface of the filter, and such an element is commonly referred to as a "knife blade." Because of the relatively large sizes of prior art rotary drum filters, the mass of filter cake being removed from the surface of the filter by such "knife edges" can be relatively large, requiring that such "knife edges" be fabricated from a strong structural material, such as metal. Including a relatively sharp surface on such "knife edges" aids in the removal of a large mass of filter cake from the filters.

Because inner drum 18 is of a relatively small size, the mass of the filter of filter cake being removed as inner drum 18 rotates past edge 30 is significantly less than the mass that would be removed in a much larger prior art rotary drum filter. As long as edge 30 is capable of removing a portion of the filter cake deposited on filter 22 as inner drum 18 rotates, the relative "sharpness" of edge 30 is not critical. A prototype device fabricated from a plastic material has successfully proven that edge 30, fabricated without any attention given to the relative "sharpness" of the edge, is quite effective in removing filter cake from the surface of filter 22. Preferably edge 30 will remove from approximately $\frac{1}{16}^{th}$ inch to approximately $\frac{1}{8}^{th}$ inch of filter cake from the surface of filter 22. Removing more than approximately $\frac{1}{8}^{th}$ inch of filter cake will likely result in a filter cake that is not as dry as would be desired.

In prior art rotary drum filters, means other than a edge have been used to remove filter cake from a rotating drum filter. For example, serpentine belts, bursts of compressed gas or air, and an additional, smaller rotating drum (roller discharge) have been used for this purpose. While any of these means could be incorporated into a disposable rotary drum filter of the present invention, each introduces additional complexity into a design that is intentionally simple. Thus, edge 30 is used in the disclosed preferred embodiment of the present invention for removing filter cake from inner drum 18.

Figure 2:
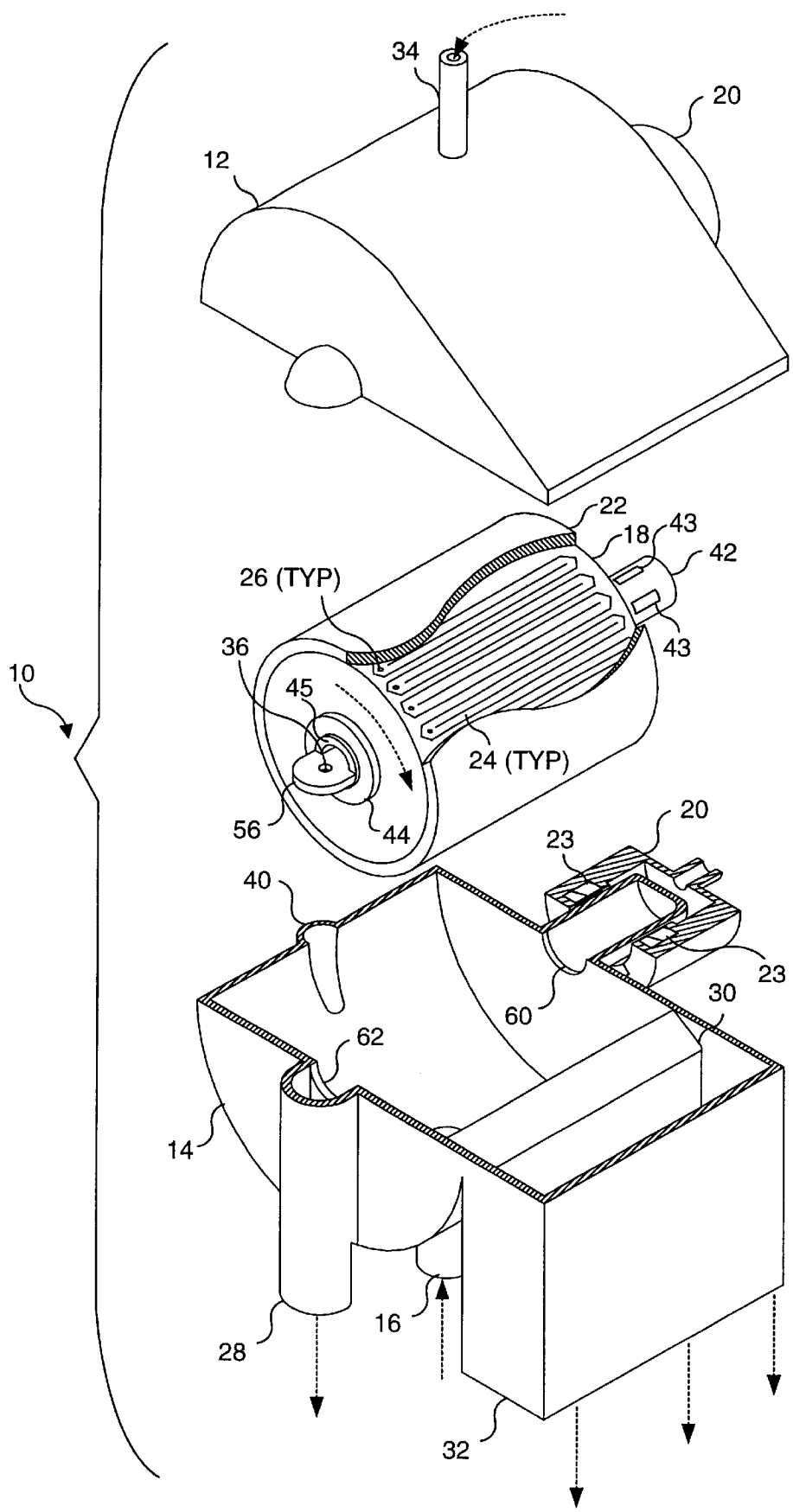
FIG. 2 is an exploded isometric view of the disposable rotary drum filter of FIG. 1.

FIG. 2 is an exploded view of disposable rotary drum filter 10. In this perspective, it can be clearly seen how lower housing 14 forms a trough or reservoir for the slurry in which inner drum 18 is partially immersed. Note that lower housing 14 includes overflow outlet 40 with a lower edge of its opening positioned at an elevation selected to ensure that a desired maximum level of slurry in rotary drum filter 10 is maintained. If the level of slurry is not controlled, excess unfiltered slurry entering the housing would flow over edge 30, and exit the rotary drum filter through filter cake discharge 32. Typically, overflow outlet 40 will be positioned such that about 30–35% of inner drum 18 is bathed in slurry.

FIG. 2 also illustrates details showing how external coupling hub 20 is drivingly coupled to inner drum 18. One end of inner drum 18 has a shaft 42 which extends outward from inner drum 18 along its longitudinal axis. Upper and lower housing 12 and 14 are shaped to accommodate shaft 42, so that shaft 42 is fully enclosed when upper housing 12 and lower housing 14 are joined. External coupling hub 20 nests over shaft 42, and is drivingly connected to a prime mover (not shown). Because disposable rotary drum filter 10 is a relatively small unit, the mass of inner drum 18 is quite small. Thus, the prime mover used to drive external coupling hub 20 can be a small fractional horsepower alternating current (AC) or direct current (DC) electric motor. Preferably inner drum 18 will be rotated at a speed of one to ten revolutions per minute (RPM), although it is anticipated that a broader range of rotational speeds can be beneficially employed. It should be noted that these rotational speeds are simply exemplary, and are not intended to be limiting on the scope of the present invention. The optimal rotational speed is a function of the concentration of the solids in the slurry, the porosity of the filter, and the strength of the vacuum. Thus it is preferable for the prime mover to have a variable output such that the RPM of inner drum 18 can be selectively varied. However, a prime mover having a fixed output of one to ten RPM could also be used. Preferably external coupling hub 20 is drivingly coupled to shaft 42 magnetically, through the coupling between a plurality of permanent magnets 23 on the coupling hub and a corresponding plurality of permanent magnets 43 on the shaft, as will be described in more detail in relation to the description of FIG. 5. The prototype unit discussed below was successfully operated using a ⅟₃₀ horsepower motor, with a torque rating of 50 inch/pounds. For embodiments employing a magnetically coupled external prime mover, it is anticipated that magnetic coupling will be successful if the torque applied by the external prime mover is limited to less than 12 inch/pounds.

With respect to the relative size of disposable rotary drum filter 10, a prototype unit in which inner drum 18 is approximately 3 inches in diameter by 4.5 inches in length has been successfully tested. While it is likely that substantially larger rotary drum filters will be built in accord with the present invention, the relatively small unit size enables the device to be sufficiently low in cost to be considered disposable after use in processing a single batch of slurry.

Tests of this initial prototype disposable rotary drum filter have determined that it can process a typical slurry at a rate of about 1–3 liters/minute. Based upon this determination, it appears that this prototype of the present invention is usable for processing batches ranging, for example, from about 10–1800 liters in volume. It is expected that a disposable rotary drum filter of this size would be ideal for use in applications such as the animal studies required for drug testing, clinical trial production, and other moderate sized batch applications. A smaller sized unit with an inner drum 3" long by 1.5" in diameter should operate at rates of about 300–650 ml/minute, making it ideal for processing batch sizes of up to 400 liters. This smaller size disposable rotary drum filter would thus be suitable for use in processing small laboratory batches typically seen in the early stages of drug development, and other small scale batch applications. Finally, a larger unit with an inner drum 20" long and 10" in diameter should be able to process about 14–40 liters/ minute, making it applicable for processing batches from 200–24,000 liters in volume. This larger size disposable rotary drum filter would thus be suitable for most batch processing operations involving large scale production, as even in large scale production facilities individual batch sizes are often less than 24,000 liters in volume. It should be noted that these examples of size and processing capability are simply exemplary and are not intended to be limiting on the scope of the present invention. However, it is also recognized that the present invention is not infinitely scaleable, if the intention is maintained of keeping the costs of the device relatively low.

Referring again to FIG. 2, it will be noted that lower housing 14 includes one half of a journal 60 that supports shaft 42, and one half of a journal 62 that supports a collar 45, which is formed around the central opening into inner drum 18 at one end of the inner drum. Upper housing 12 and lower housing 14 extend outwardly beyond journal 60 to fully enclose shaft 42. While not shown in this Figure, it should be understood that upper housing 12 includes the other halves, respectively, of journals 60 and 62. Journals 60 and 62 are sized such that shaft 42 and collar 45 are supported by the journals, yet so that the shaft and collar can rotate freely about the longitudinal axis of inner drum 18 within these journals. Since no bearings are included in journals 60 and 62, eventually long-term wear at these journals might cause failure of the rotary drum filter. But because rotary drum filter 10 is designed to be disposable, short-term wear is acceptable, as even inexpensive plastic materials are expected to be sufficiently wear resistant to achieve a service life in excess of the time for processing a single batch volume. It should also be noted that the relatively low mass of inner drum 18, in addition to the self lubricating characteristics of plastic materials, provide a service life sufficient to process a batch volume without the use of expensive bearings. In at least one embodiment, inner drum 18 is hollow, and the buoyancy of the slurry reduces the load on the lower portions of journals 60 and 62, further reducing wear at those locations.

A sealing surface 44 on the central end of inner drum 18 minimizes the leakage of slurry in bypass of filter 22, preventing the slurry from exiting the unit through filtrate discharge 28. This end of the inner drum is biased against the interior surface of the housing around journal 62, as explained below in the discussion of FIG. 5.

An additional structural element that is shown in FIG. 2 is a plate 56, which is fixedly attached to the interior of housing 1I. Plate 56 is elongate and extends into inner drum 18 to a depth beyond the radial disposition of orifices 26. Inner drum 18 rotates freely about plate 56. As will be described in more detail below, plate 56 effectively separates the interior of inner drum 18 into an upper portion and a lower portion, and as the inner drum rotates, the orifices in the inner drum that are above the plate (in fluid communication with the then upper portion) and those that are below the plate (in fluid communication with the then lower portion) changes. An orifice 36 formed in plate 56 is sized to ensure that a vacuum source (not shown in this Figure) that is in fluid communication with filtrate discharge 28 draws filtrate from the filtrate discharge at a desired rate and is not defeated by being subject to full ambient air pressure (or the pressure of any gas being introduced via gas inlet 34).

Figure 3:
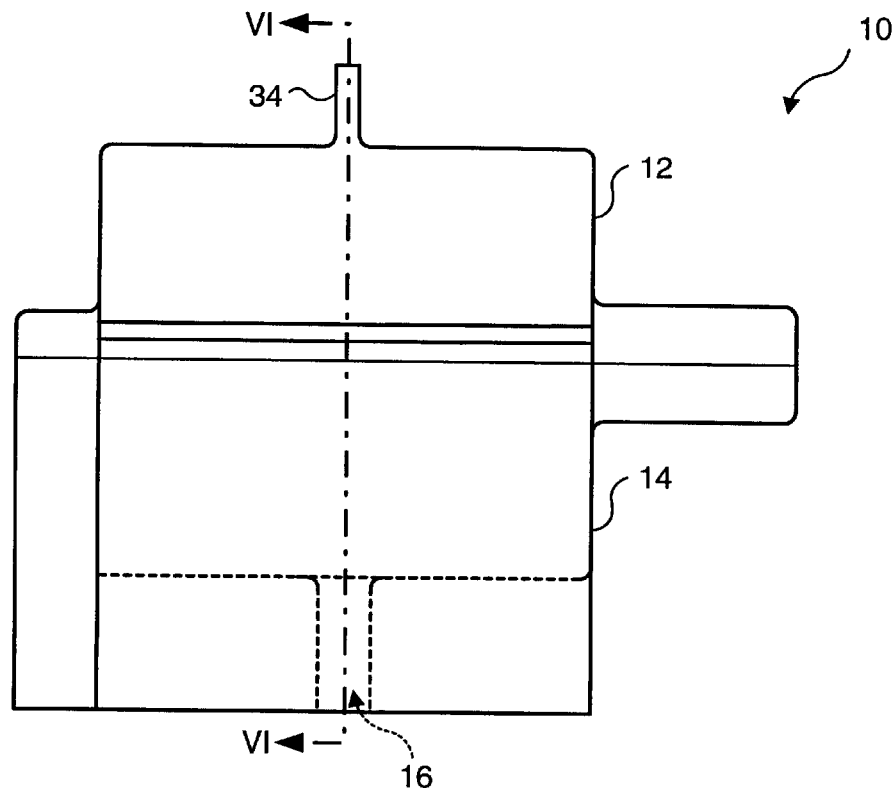
FIG. 3 is a front elevation of the disposable rotary drum filter of FIGS. 1 and 2.
Figure 4:
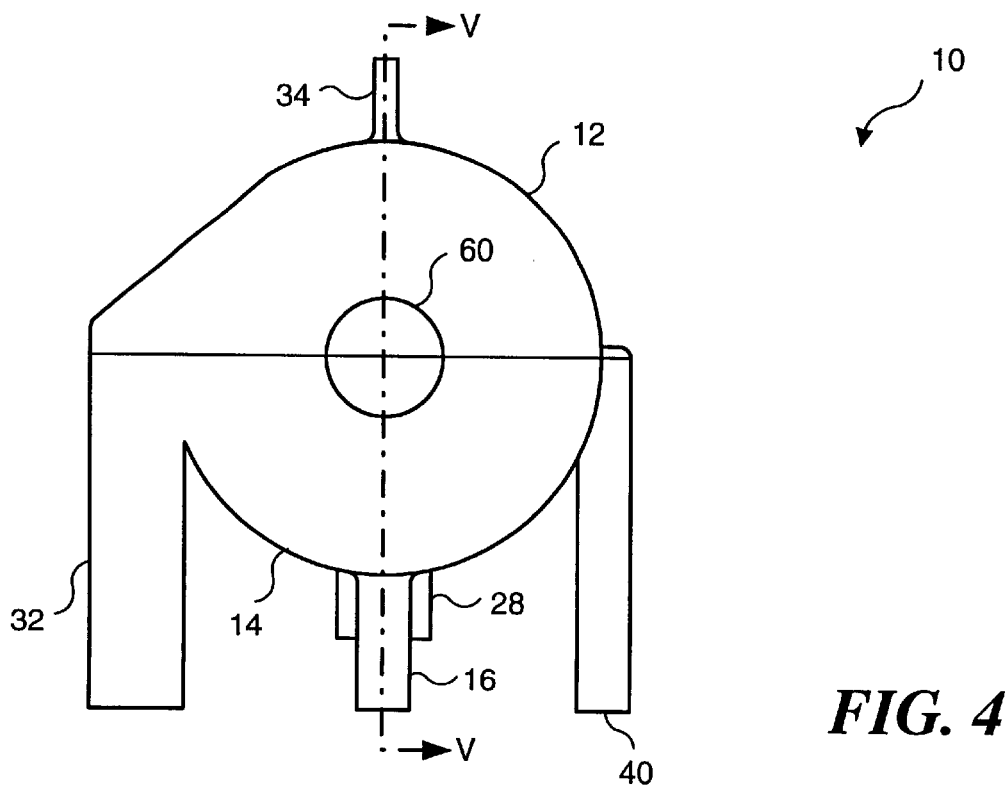
FIG. 4 is a right side elevation of the disposable rotary drum filter of FIGS. 1 and 2.

In FIGS. 3 and 4, gas inlet 34 can be seen at the top of upper housing 12 in each Figure. FIG. 3 clearly illustrates how the upper and lower housings extend outwardly to enclose shaft 42. FIG. 4 clearly shows filter cake discharge 32, slurry inlet 16, filtrate discharge 28, and slurry overflow 40. It is important to note that while FIG. 4 might lead one to conclude that filter cake discharge 32 and overflow 40 (and to some extent slurry inlet 16) are acting as legs and thereby providing support for disposable rotary drum filter 10, that is not the case. Filter cake discharge 32, slurry overflow 40 and slurry inlet 16 cannot be used to support disposable rotary drum filter 10, because these elements must be accessible so that they may be connected to the appropriate vessels (a filter cake receptacle and a slurry supply source), or connected to appropriate fluid lines.

Accordingly, disposable rotary drum filter 10 will likely be secured in a cradle (not shown) that supports the arcuate portion of lower housing 14. Alternatively, if desired, downwardly depending legs can be formed on lower housing 14. However, because inner drum 18 is rotating (albeit at a modest 1–10 RPM), disposable rotary drum filter 10 is subject to some vibration, and it is preferable that the unit be secured to prevent movement, particularly when disposable rotary drum filter 10 is being used in a pharmaceutical or fine chemical application in which the value of the material being processed can be extremely high. Those of ordinary skill in the art will readily understand that a variety of different support structures can be used to provide support for disposable rotary drum filter 10.

It should also be noted that the idea of using an inexpensive and disposable piece of equipment in a process involving very high value material is not as unusual as it might initially appear. One might normally expect that only expensive equipment would be used to process high value material. However, the disposable nature of the unit means that the requirement of cleaning a filtering unit in between batches is eliminated, since a new clean filtering unit will be used for each successive batch processed. As noted previously, use of a disposable rotary drum filter in accord with the present invention effects labor cost savings related to the equipment cleaning and pre-batch processing setup, and perhaps more importantly, minimizes the potential for introducing contaminants, possibly missed in a cleaning process, into a next batch of high value material. Such contaminants could conceivably destroy the value of the entire batch. As the value of the batch increases, so does the need to eliminate potential sources of contamination. So while a disposable rotary drum filter in accord with the present invention is an inexpensive piece of equipment, it offers significant advantages in the processing of high value material.

Figure 5:
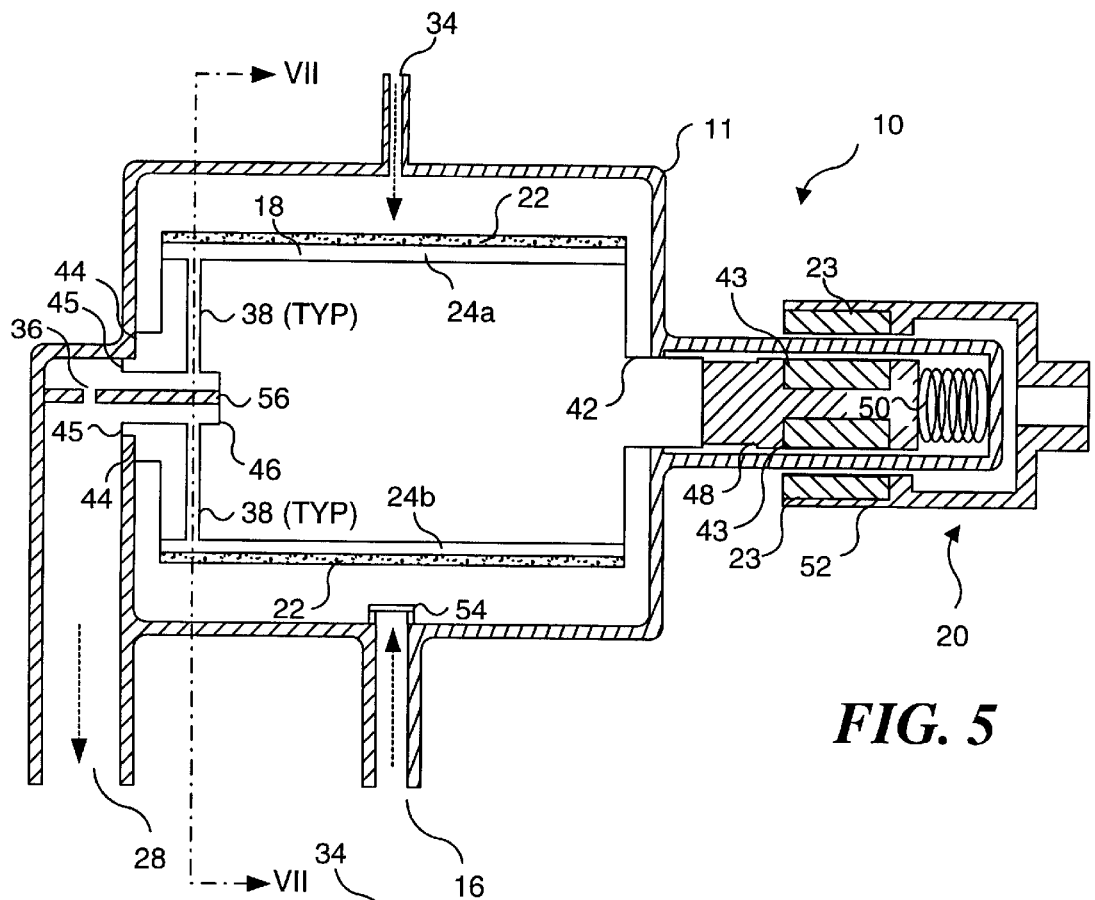
FIG. 5 is a cross-sectional view taken along section line V—V of FIG. 4, showing mounting details for an inner drum used in the disposable rotary drum filter of FIGS. 1 and 2.

FIG. 5 shows further details for the support of shaft 42. Shaft 42 can either be formed integral to inner drum 18, or can be a separate component that is fixedly attached to inner drum 18. Preferably, shaft 42 is integral to inner drum 18, so that fewer production steps are required to produce disposable rotary drum filter 10. On the opposite end of disposable rotary drum filter 10, collar 45 is supported by journal 62, cooperatively formed in the upper and lower housings (as is clearly shown in FIG. 2). As noted above, the fit between journal 60/shaft 42 and journal 62/collar 45 should be sufficiently tight to provide the required support, yet loose enough so as to enable inner drum 18 to freely rotate.

Shaft 42 incorporates a magnetic portion 48 in which are disposed permanent magnets 43 to enable inner drum 18 to be drivingly rotated without requiring a direct drive coupling that penetrates housing 11. Because disposable rotary drum filter 10 is expected to find application in the pharmaceutical and food industries, it is important that the interior of the housing be isolated from contaminants in the environment. Eliminating a drive coupling that requires an additional opening in housing 11 enhances the sealed state of the interior of the housing to isolate the material being processed from environmental contaminates. Magnetic portion 48 is magnetically coupled to a magnetic portion 52 in external coupling hub 20 in which are disposed permanent magnets 23. External coupling hub 20 incorporates a cavity having a size and shape corresponding to shaft 42. Note that the strength of the magnets must be such that magnetic coupling across the thickness of housing 11 is readily achievable.

Those of ordinary skill in the art will readily understand that a variety of modifications are possible with respect to magnetically coupled drives. Magnetic portion 48 could include a plurality of strips of magnetic material rather than permanent magnets 43. Similarly, magnetic portion 52 could include a plurality of circumferentially spaced-apart strips of magnetic material, rather than permanent magnets 23. As a further alternative, magnetic portion 52 could include a plurality of spaced-apart electromagnets rather than permanent magnets. Because rotary drum filter 10 is designed to be disposable, the lowest cost option capable of providing the rotational driving force to shaft 42 is generally preferred. Note, however, that external coupling hub 20 is not intended to be disposable, but instead, will likely be reusable and can be left permanently attached with a set screw or key to a drive shaft of an electric motor or other prime mover (not shown). Thus, it is envisioned that an economical design will likely include relatively powerful and more expensive permanent magnets 23 in external coupling hub 20, and relatively inexpensive magnets 43 or strips of magnetic material (such as iron) on shaft 42. In such an embodiment the magnets in external hub 20 can be either permanent magnets, or electromagnets.

Note that it is possible to fabricate magnetic portion 48 as a reusable component that is removably attached to drive shaft 42, to be removed and reused in subsequent disposable rotary drum filters, thus enabling more expensive, more powerful magnets to be used without adversely impacting the cost of the devices. However, such a component would increase the number of steps required to set up and discard disposable rotary drum filter 10, adding complexity to a device that by design is elegantly simple, yet extremely effective and easy to operate.

It should also be noted that at least a portion of shaft 42 could be in contact with the slurry in disposable rotary drum filter 10, thus preferably, the permanent magnets or strips of magnetic material that are included on shaft 42 must be inert and unaffected by chemicals in the slurry during the time of its use. Polymer coated magnets, gold coated magnets (e.g., rare earth magnets used for magnetic therapy are frequently coated in gold, and are readily available), and polymer coated magnetic material can be used in the present invention. The use of such an inert material coating is especially important when disposable rotary drum filter 10 is to be employed in a pharmaceutical application, or in any other application where components that are not inert might introduce some contamination (such as rust from uncoated permanent magnets or magnetic material) into the slurry. In some applications, the introduction of a contaminant such as rust might not be a problem, and in such cases, the use of coated magnets (or strips of magnetic material) would not be required.

A helical spring 50 is disposed between the end of shaft 42 and the inner surface of the portion of the housing that surround the shaft. This spring biases inner drum 18 toward the end of disposable rotary drum filter 10, ensuring that sealing surface 44 is sealingly abutted against housing 11. Note that helical spring 50 must not provide so much tension that friction between sealing surface 44 and the inside surface of the housing against which it abuts prevents the inner drum from rotating. In a device designed to be durable over a long-term use, a rotating seal like that used in the present invention would represent an unacceptable source of wear. However, since disposable rotary drum filter 10 is designed to be discarded after treating a batch of material, the design of this seal is completely appropriate here. Helical spring 50 also helps to compensate for expansion and contraction of the housing due to any temperature changes that may occur during use. In at least one embodiment, helical spring 50 is fabricated from a plastic material.

It is anticipated that in one embodiment, the magnetic force described above (coupling shaft 42 to external coupling hub 20) will also provide a biasing force to position inner drum 18 toward the end of disposable rotary drum filter 10, similarly ensuring that sealing surface 44 is sealingly abutted against housing 11. In such an embodiment, helical spring 50 is not required. FIG. 5 shows a distributor 54, which distributes slurry entering via slurry inlet 16, thereby deterring the accumulation of solids in the bottom of the housing 11. Preferably distributor 54 is a flat circular plate that distributes the incoming slurry flow outwardly from the longitudinal center of the slurry inlet, although shapes other than a circular plate can be used. The distance between distributor 54 and housing 11 is such that the diverted flow retains a sufficient velocity to prevent the solids suspended in the incoming slurry from accumulating in the bottom of housing 11.

Also shown in FIG. 5 are filtrate tubes 38, which provide fluid communication between fluid channels 24 and filtrate discharge 28. As is clearly illustrated in FIG. 7, filtrate tubes 38 are arrayed in a radial pattern, with each fluid channel 24 being provided a filtrate tube 38 that conveys filtrate from one of the fluid channels toward the center at the end of inner drum 18 that is adjacent to filtrate discharge 28. Filtrate tubes 38 terminate in a cavity 46 that is disposed along the longitudinal axis of inner drum 18, and which is in fluid communication with filtrate tubes 38 and filtrate discharge 28.

Disposed within cavity 46 is plate 56. As noted above, plate 56 effectively separates the interior of inner drum 18 into which the plate extends, into an upper portion and a lower portion. The purpose of plate 56 and orifice 36 is to provide a mechanism to equalize pressure within disposable rotary drum filter 10. Orifice 36 is sized so that a pressure within fluid channels 24, orifices 26, and filtrate tubes 38 in the current upper portion of inner drum 18 is substantially equal to a pressure within fluid channels 24, orifices 26, and filtrate tubes 38 in the current lower portion of inner drum 18. The size of orifice 36 determines the flow of fluids through filtrate discharge, because the size of orifice 36 regulates the pressure differentials within housing 11, thereby effecting a filtrate flow rate through disposable rotary drum filter 10.

Flow resistance for air (or gas) within fluid channels 24*a* defined by the frame comprising the upper portion of the inner drum is much smaller than flow resistance for liquid filtrate within fluid channels 24*b* defined by the frame comprising the lower portion of the inner drum. Without a mechanism to equalize the pressure drops through these two different sets of fluid channels and their corresponding filtrate tubes, a relatively weak vacuum source coupled to the filtrate discharge would only draw air from the disposable rotary filter. In traditional rotary drum filters, this problem is solved by the use of a complicated filter valve (see U.S. Pat. Nos. 4,419,165 and 4,515,693, for example).

The use of such complicated valves is not appropriate in a device designed for low cost, simplicity, and disposability.

By providing orifice 36 in the plate 56, the applied vacuum can only draw a limited amount of gas through the filtrate discharge. Further, the size of orifice 36 is selected to achieve the desired ratio of gas flow to filtrate flow from the disposable rotary filter. Note that air (or some other supplied gas) enters disposable rotary drum filter 10 though gas inlet 34 to compensate for the volume of air (or gas) that flows out of disposable rotary drum filter 10 via filtrate discharge 28. For applications in which it is beneficial to isolate the material being processed from external contaminants that could be found in ambient air, an air filter (not shown) can be attached to gas inlet 34. Alternately, gas inlet 34 can be placed in fluid communication with a source of pre-filtered air or gas, such as a tank of compressed nitrogen. Appropriate air filters and clean air sources are well known in the art.

It should be noted that when the relative size of disposable rotary drum filter 10 is small, and if the vacuum source that is in fluid communication with filtrate discharge 28 is relatively strong, control of the pressure differentials within housing 11 is not required (because under such circumstances the vacuum source is so much stronger than a minimal vacuum level required for the unit to draw the slurry into the filter). As used herein to describe a vacuum source, the terms "weak" and "strong" refer to the vacuum level achievable by the vacuum source, i.e., a "strong" vacuum source draws a substantially lower vacuum level than a "weak" vacuum source. When a relatively weak vacuum source is used, control of the pressure differentials within housing 11 can be a concern. Note that because the strength of the vacuum source required is directly related to the size of the rotary drum filter, it is only when disposable rotary drum filter 10 is relatively small that a standard industrial vacuum source is likely to provide a significantly lower vacuum level than would minimally be required. Because of the significantly larger sizes of prior art rotary drum filters, the strength of the vacuum sources typically used is not significantly greater than that capable of achieve a minimally required vacuum level, necessitating the control of pressure differentials within the prior art units by the use of complicated valve mechanisms. It is anticipated that a vacuum level of 0.25 to 0.50 atmospheres will be sufficient to operate disposable rotary drum filter 10.

Figure 6:
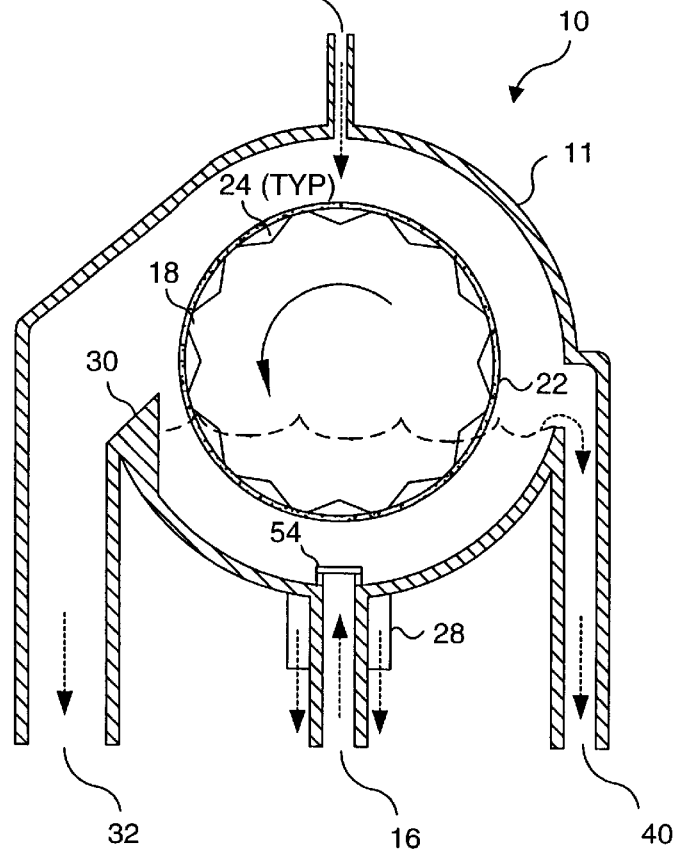
FIG. 6 is a cross-sectional view taken along line section VI—VI of FIG. 3, showing a sharp edge used for removal of solids from the inner drum, a discharge chute for the solids, and an overflow to remove excess slurry.

FIG. 6 shows further details of edge 30, which is provided for removing filter cake from an outer surface of inner drum 18, and details of filter cake discharge 32, and slurry overflow 40. Note that the arcuate shaped portion of the bottom of housing 11 serves as the slurry trough or reservoir (see also lower housing 14 in FIG. 2). As the slurry fills the bottom of housing 11, it reaches the level of the lower edge of the opening into slurry overflow 40, and exits disposable rotary drum filter 10. The level of this opening thus determines a maximum slurry level (generally as indicated by the dash lines). As noted above, preferably 30–35% of inner drum 18 is bathed in the slurry. The triangular cross-sectional shape of fluid channels 24 formed by the frame of the inner drum can also be clearly seen in this sectional view. This shape adds structural rigidity to inner drum 18, though other shapes can be used to provide similar results.

The directions of fluid flow and inner drum rotation are clearly illustrated in FIG. 6. Raw slurry enters disposable rotary drum filter 10 via slurry inlet 16, and make up air or gas (to replace air or gas exiting the unit with the filtrate) enters via gas inlet 34. Filter cake shaved from the filter drops through disposable rotary drum filter 10 through filter cake discharge 32, and filtrate exits through filtrate discharge 28. As illustrated, inner drum 18 must rotate in the direction indicated (shown here as turning in a counterclockwise direction) for edge 30 to be effective in shaving filter cake from the filter on inner drum 18. Note that a mirror image device in which the inner drum rotates in a clockwise direction would function equally as well.

Note that the specific dimensional details for slurry inlet 16, filter cake discharge 32 and filtrate discharge 28 can be chosen as appropriate to couple with tubing, sanitary piping, ASME-type piping, or any other pipe, tube, hose, or delivery/receiving passage desired. Alternatively, the specific dimensional details for slurry inlet 16, filter cake discharge 32 and filtrate discharge 28 can be set to a standardized dimension, based on the most likely required size, and then appropriately-sized couplings can be used to accommodate the tubing, piping or hoses of different size that will be coupled thereto. The inlets and outlets for disposable rotary drum filter 10 can be integral to housing 11 as shown in the Figures, or attached to housing 11 as separate components using a suitable adhesive or fasteners.

Figure 7:
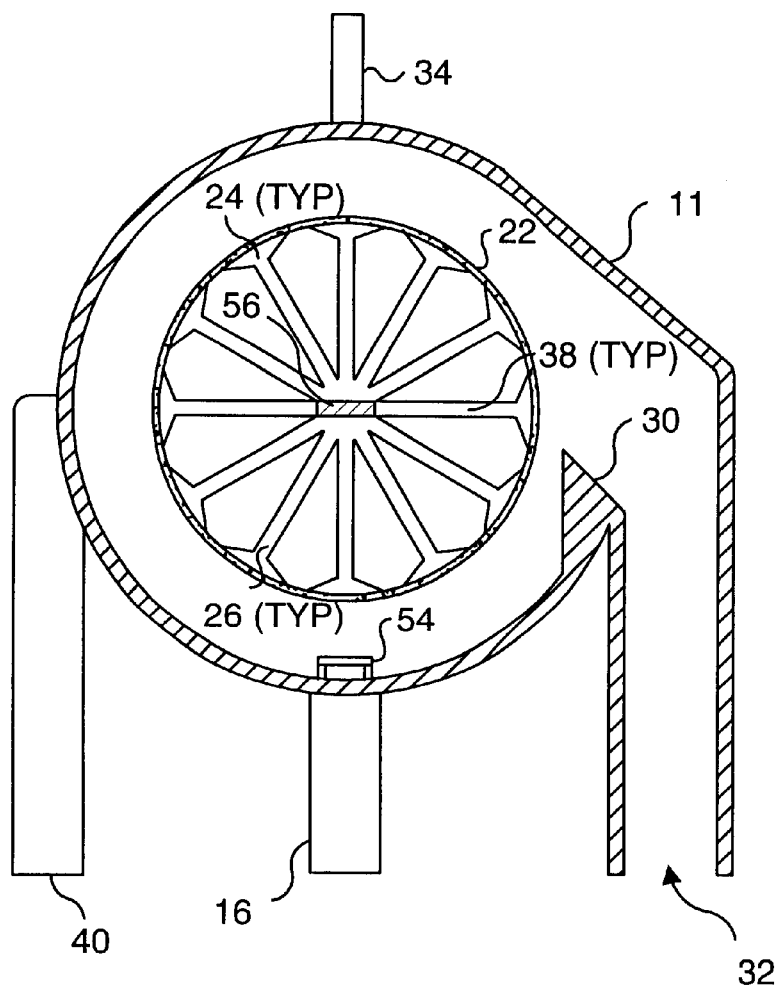
FIG. 7 is a cross-sectional view taken along section lines VII—VII of FIG. 5, showing an interior detail of the inner drum.

FIG. 7 clearly shows the radial configuration of filtrate tubes 38 and plate 56 that is used for separating the volume within housing 11 into an upper region and a lower region (as described above) to control the flow of filtrate through disposable rotary drum filter 10.

Figure 8:
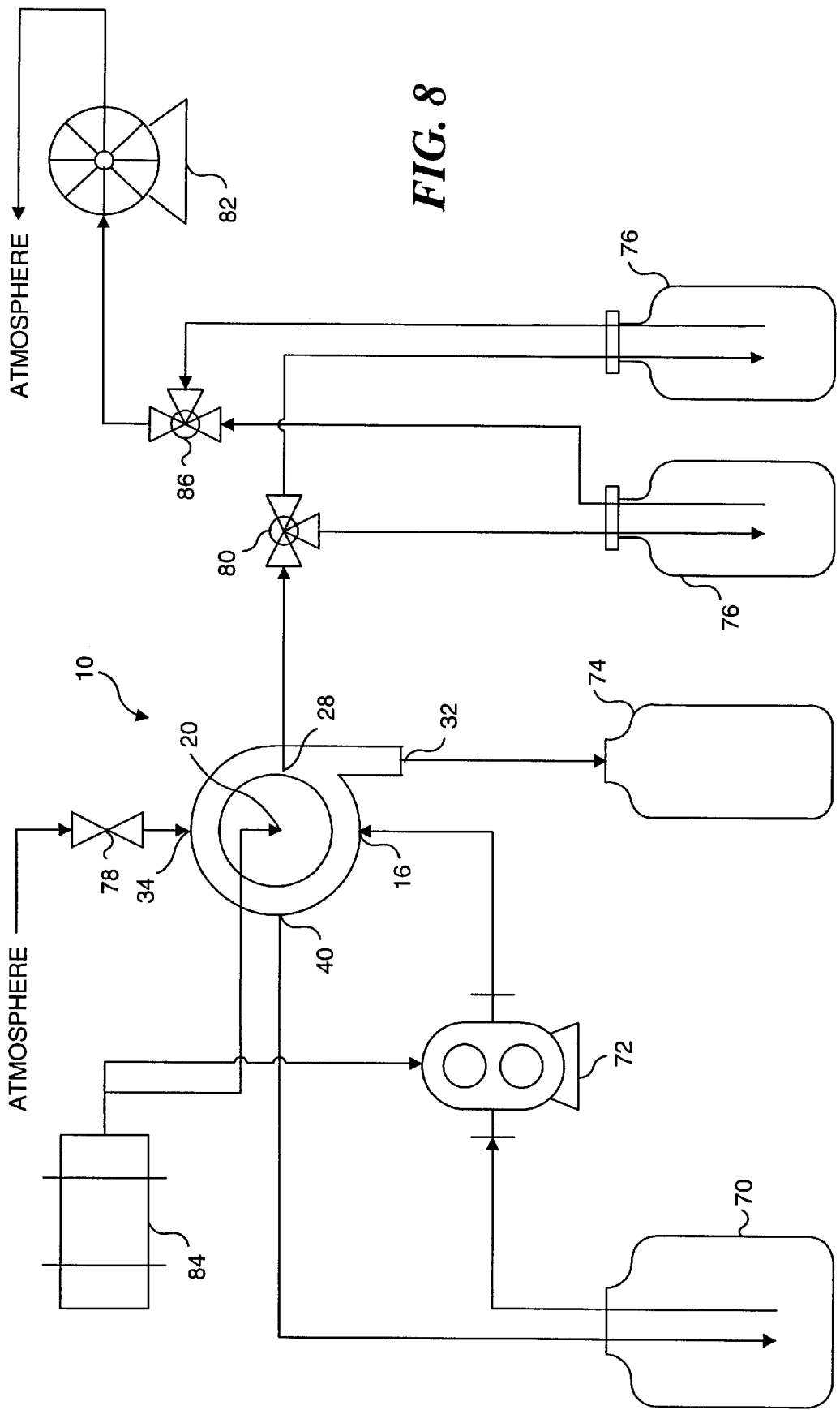
FIG. 8 is a schematic process diagram illustrating how the disposable rotary drum filter of the preceding Figures can be used to separate a slurry into a filter cake fraction and a filtrate fraction.

FIG. 8 is a processing diagram that illustrates the additional components used in conjunction with rotary drum filter 10. Raw slurry to be processed is provided from a slurry supply 70. It should be noted that slurries with extremely high levels of suspended solids (greater than 60%) generally are processed with some sort of gravity-based separation techniques. It is anticipated that the present invention will be able to process a wide variety of different types of slurries containing lower levels of suspended solids. Note that the use of plastic to fabricate rotary drum filter 10 assures compatibility with a wide variety of slurry chemicals.

A pump 72 is used to delivery slurry to slurry inlet 16 at the bottom the lower housing of rotary drum filter 10. It is anticipated that a peristaltic type pump will be particularly useful in providing the necessary pumping action, although other types of pumps can alternatively be used. A prime mover (an electric motor) 84 is preferably used to power both pump 72 and rotary drum filter 10, although a separate electric motor or other type of prime mover can be used to power pump 72. Note that to reduce the number of components used in rotary drum filter 10 and to minimize costs that enable the unit to be used once and then disposed, rotary drum filter 10 does not contain an electric motor. As explained above, disposable rotary drum filter 10 is preferably magnetically coupled via external coupling hub 20 to prime mover 84. However, prime mover could be coupled directly to shaft 42 of inner drum 18 if the shaft extended outside housing 11 through an opening that were fitted with a seal (the opening and seal are not shown). Such an arrangement would be acceptable if the material being processed were not subject to quality concerns due to the introduction of foreign matter entering through the opening for the shaft. Also, forming a leak-proof seal around the opening at which the shaft exits the housing would increase the costs and complexity of the device.

Also provided in the system employed to operate the disposable rotary filter is a vacuum source 82, which is in fluid communication with filtrate discharge 28. While prime mover 84 provides the mechanical rotational force required to rotate inner drum 18 of disposable rotary drum filter 10, vacuum source 82 provides the negative pressure that draws filtrate from disposable rotary drum filter 10 through fluid channels 24 and filtrate tubes 38, and out through filtrate discharge 28. Because of the relatively small size of disposable rotary drum filter 10, a strong vacuum source is not required. In fact, a standard vacuum pump or the in-house vacuum system that is typically readily available in industrial or commercial laboratory settings is expected to provide a much higher vacuum than required, and an appropriate throttling mechanism may be used to control the vacuum to achieve a desired level. The prototype rotary drum filter discussed above has been successfully operated using a consumer vacuum cleaner to provide the vacuum. As noted above, it is anticipated that a vacuum of 0.25 to 0.50 atmospheres will be sufficient to operate disposable rotary drum filter 10.

With prime mover 84, pump 72, and vacuum source 82 all properly connected and operating, raw slurry from slurry supply 70 is drawn into disposable rotary drum filter 10 through slurry inlet 16. The vacuum produced from the external source and applied to disposable rotary drum filter 10 through filtrate discharge 28 draws the filtrate fraction of the slurry through filter 22 as inner drum 18 is rotated through the slurry filling the bottom of lower housing 14 (see FIG. 6), depositing the filter cake on the outer surface of the filter. As inner drum 18 rotates out of the slurry, air or gas drawn through filter 22, at least partially dries the filter cake by removing additional fluid. The air that is drawn into filter 22 does create a pressure drop, which could necessitate the inclusion of plate 56 and orifice 36 as described in conjunction with FIG. 5.

The filtrate passing through filter 22 is directed into fluid channels 24 that extend longitudinally along the frame of the inner drum under filter 22. These fluid channels extend along the length of inner drum 18 and are distributed in spaced-apart array evenly around the circumference on its frame. The vacuum from vacuum source 82 and filtrate discharge 28 draws the filtrate through fluid channels 24, and into orifices 26 that are disposed in the then current lower portion of the inner drum. The filtrate is then drawn through filtrate tubes 38 into cavity 46, and exits through filtrate discharge 28. The air (or other gas) drawn through filter 22, similarly passes through fluid channels 24, orifices 26, filtrate tubes 38 and cavity 46, and then exits disposable rotary drum filter 10 via filtrate discharge 28. Additional air (or gas) must be introduced into disposable rotary drum filter 10 to make up for the air (or gas) that exits. This makeup air (or gas) enters disposable rotary drum filter 10 through gas inlet 34. A valve 78 can be included to control the volume of makeup air (or gas) introduced into disposable rotary drum filter 10 via gas inlet 34. Note that gas inlet 34 can be in fluid communication either with the ambient atmosphere, if air is the selected gas, or in fluid communication with a different gas source, such as a compressed gas tank. The advantage of using a compressed gas supply is that an inert gas, such as nitrogen, can be used. Even if air is the gas selected, a compressed gas supply source can be used to provide air that is clean and filtered, to reduce the likelihood of introducing any contaminants into disposable rotary drum filter 10. If ambient air, rather than a compressed gas supply source is used, filters (not shown) can be used to "clean" the ambient air before it is introduced into disposable rotary drum filter 10. Such filters are well known in the art.

As illustrated in FIG. 8, filtrate exiting disposable rotary drum filter 10 is selectively diverted by a valve 80 to one of two filtrate receivers 76. A valve 86 selectively connects vacuum source 82 to the selected filtrate receiver so that the vacuum source is applied through the filtrate receive to the filtrate discharge. Note that a single filtrate receiver 76 can be employed if it is sufficiently large to accommodate the desired batch volume. Incorporating a plurality of filtrate receivers 76 and a valve 86 into a system used in conjunction with disposable rotary drum filter 10 ensures that a full filtrate receiver 76 can be isolated from filtrate discharge 28 and replaced with an empty filtrate receiver 76, while at the same time an additional filtrate receiver 76 is connected to filtrate discharge 28 and vacuum source 82, enabling disposable rotary drum filter 10 to be operated continuously without interruption. Note that a filter cake receiver 74 is not in fluid communication with vacuum source 82, and that replacing a full filter cake receiver 74 with an empty unit does not require a similar valve and multiple receiver arrangement to ensure that disposable rotary drum filter 10 can be operated continuously. It should also be understood that more than two filtrate receivers 76 can be employed, as long as filtrate discharge 28 remains in fluid communication with vacuum source 82 while disposable rotary drum filter 10 is in operation.

As inner drum 18 rotates, the filter cake is deposited on the filter out of the slurry, and then the filter cake is dried by the flow of air or gas through it. When inner drum 18 reaches approximately the 9 o'clock position, at least a portion of the built-up filter cake is removed by contacting edge 30. Note that edge 30 does not remove all of the filter cake from the filter, as a certain clearance (preferably $1/16^{th}$ to $1/8^{th}$ inch) is provided between edge 30 and inner drum 10 in order to leave a predetermined thickness of filter cake on the filter throughout the operation of disposable rotary drum filter 10. The filter cake shaved away by edge 30 falls down filter cake discharge 32 under the influence of gravity, into a filter cake receiver 74. Preferably filter cake receiver 74 is temporary sealed to filter cake discharge 32 to maintain sealed integrity within disposable rotary drum filter 10. Either the filter cake and/or the filtrate can then be employed as desired in any further processing steps, depending upon the specific application of the disposable rotary drum filter. After the batch of slurry is processed, the prime mover is de-energized to stop both pump 72 and the rotation of inner drum 18. The rotary drum filter can then be removed and discarded in an appropriate manner.

Although the present invention has been described in connection with the preferred form of practicing it and modifications thereto, those of ordinary skill in the art will understand that many other modifications can be made thereto within the scope of the claims that follow. Accordingly, it is not intended that the scope of the present invention in any way be limited by the above description, but instead be determined entirely by reference to the claims that follow.

The invention in which an exclusive right is claimed is defined by the following:

1. A disposable rotary drum filter for separating a slurry into a liquid filtrate and a solid filter cake, comprising:
   (a) a housing defining a slurry reservoir and including:
      (i) a slurry inlet adapted to receive a slurry into the slurry reservoir;
      (ii) a gas inlet adapted to receive gas into the housing;
      (iii) a filtrate outlet adapted to convey filtrate from the housing after the filtrate has been separated from the filter cake;
      (iv) a filter cake outlet adapted to convey the filter cake from the housing; and
      (v) an overflow outlet disposed within the housing and having an opening disposed at an elevation within the housing that is selected to determine a maximum level of a slurry within the slurry reservoir;

(b) an inner drum rotatably mounted within said housing, said inner drum comprising:
  (i) a generally cylindrical frame;
  (ii) a filter extending around said generally cylindrical frame, the inner drum being disposed within the housing such that said filter is partially below the level determined by the opening of the overflow outlet, said filter being adapted to receive a filter cake deposited on an outer surface of said filter as the filtrate separated from the filter cake is drawn through the filter and the filtrate outlet;
  (iii) a portion of said generally cylindrical frame providing fluid communication between an interior surface of said filter and said filtrate outlet and thereby adapted to convey the filtrate from said inner drum after the filtrate has passed though said filter; and
  (iv) a driven member connected to said generally cylindrical frame and adapted to be drivingly coupled to an external prime mover to rotate the inner drum, exposing the filter cake deposited on the filter to gas that is drawn through the filter into the inner drum from inside the housing, to at least partially dry the filter cake; and (c) means for removing at least a portion of said filter cake deposited on said filter after the filter cake has been at least partially dried by the gas so that the filter cake that is thus removed passes through said filter cake outlet.

2. The disposable rotary drum filter of claim 1, wherein the slurry inlet is disposed at a bottom of the housing and is adapted to couple to a fluid line that conveys the slurry from an outlet of a slurry pump.

3. The disposable rotary drum filter of claim 1, wherein the slurry reservoir is disposed in a lower portion of the housing, such that said inner drum is partially disposed within the slurry reservoir.

4. The disposable rotary drum filter of claim 1, wherein said housing further includes a journal that supports said inner drum so as to enable the internal drum to freely rotate about a longitudinal axis of the inner drum.

5. The disposable rotary drum filter of claim 4, further comprising a spring that exerts a biasing force to position said inner drum at a desired position along the longitudinal axis of the inner drum within said housing.

6. The disposable rotary drum filter of claim 5, wherein said spring is disposed between said driven member and said housing.

7. The disposable rotary drum filter of claim 1, wherein said filter cake outlet is oriented vertically, such that a gravitational force facilitates the removal of said filter cake from the housing.

8. The disposable rotary drum filter of claim 1, wherein said filter cake outlet is elongate and is disposed along one side of the housing, extending generally in alignment with the outer surface of the filter.

9. The disposable rotary drum filter of claim 1, wherein the means for removing at least the portion of said filter cake comprises an elongate edge formed in said housing and extending adjacent to the outer surface of the filter.

10. The disposable rotary drum filter of claim 1, wherein said filtrate outlet is adapted to couple to a fluid line connected with a vacuum source.

11. The disposable rotary drum filter of claim 1, wherein said filter comprises a porous material having a plurality of openings sized to enable the filtrate to pass therethrough, while blocking passage of the filter cake.

12. The disposable rotary drum filter of claim 11, wherein said porous material comprises a porous plastic.

13. The disposable rotary drum filter of claim 1, wherein said gas inlet is disposed in an upper part of the housing.

14. The disposable rotary drum filter of claim 13, further comprising pressure control means for equalizing a pressure drop within said housing as the gas within the housing is drawn into the inner drum through the filter.

15. The disposable rotary drum filter of claim 14, wherein said pressure control means comprises an orifice through which gas flowing through the filtrate outlet is drawn.

16. The disposable rotary drum filter of claim 15, wherein the orifice is formed in a plate disposed adjacent to the filtrate outlet; and wherein a fluid flow through said filter is optimized by selecting an appropriate size of said orifice in said plate.

17. The disposable rotary drum filter of claim 1, wherein said inner drum further comprises a plurality of fluid channels in fluid communication with said filtrate outlet.

18. The disposable rotary drum filter of claim 1, wherein the inner drum further comprises a plurality of orifices in fluid communication with said filtrate outlet.

19. The disposable rotary drum filter of claim 1, wherein the inner drum further comprises a plurality of filtrate tubes in fluid communication with said filtrate outlet.

20. The disposable rotary drum filter of claim 1, wherein the inner drum further comprises:
  (a) a plurality of fluid channels disposed between said filter and said generally cylindrical frame and extending longitudinally along the generally cylindrical frame;
  (b) a cavity in fluid communication with said filtrate outlet; said cavity being disposed proximate a center of said inner drum and adjacent to an end of said inner drum; and
  (c) a plurality of filtrate tubes connecting said longitudinal fluid channels in fluid communication with said cavity, thereby establishing a fluid path between said longitudinal channels and said filtrate outlet.

21. The disposable rotary drum filter of claim 20, further comprising a plate that separates said cavity into an upper portion and a lower portion, said plate being fixedly attached to said housing with said inner drum being free to rotate about said plate.

22. The disposable rotary drum filter of claim 20, wherein said plate includes an orifice that controls a gas flow between said upper portion and said lower portion of the cavity and thereby control gas flow through the filter from inside the housing.

23. The disposable rotary drum filter of claim 22, wherein said generally cylindrical frame adds structural integrity to said inner drum.

24. The disposable rotary drum filter of claim 23, wherein said plurality of fluid channels have a cross-sectional shape that is one of a rectangular shape, a triangular shape, and a sigmoid shape.

25. The disposable rotary drum filter of claim 1, wherein said driven member comprises a shaft.

26. The disposable rotary drum filter of claim 25, wherein said shaft is adapted to magnetically couple to an external prime mover.

27. The disposable rotary drum filter of claim 26, wherein said shaft includes a magnet.

28. The disposable rotary drum filter of claim 26, wherein a plurality of permanent magnets are disposed in a spaced-apart array around an end of the shaft.

29. The disposable rotary drum filter of claim 1, further comprising an external coupling hub adapted to be drivingly connected to a prime mover.

30. The disposable rotary drum filter of claim 29, wherein said driven member is magnetically coupled to said external hub.

31. The disposable rotary drum filter of claim 30, wherein said external hub comprises at least one magnet.

32. The disposable rotary drum filter of claim 30, wherein said external hub comprises at least one electromagnet.

33. The disposable rotary drum filter of claim 1, wherein said means to remove said filter cake comprises an edge of a material extending adjacent to and spaced apart from the filter.

34. The disposable rotary drum filter of claim 33, wherein said edge has a length that is at least one of substantially equal to that of said inner drum, and substantially equal to a length of said housing.

35. The disposable rotary drum filter of claim 34, wherein said edge is formed as an integral part of said housing.

36. The disposable rotary drum filter of claim 1, wherein the filter is generally cylindrical in shape and extends generally between opposite ends of the generally cylindrical frame.

37. The disposable rotary drum filter of claim 1, wherein said housing is fabricated from a material that can be readily sterilized.

38. The disposable rotary drum filter of claim 1, wherein said housing is fabricated from a material that can be readily sterilized by one of ethylene oxide, steam, gamma radiation, electron beam radiation, and light.

39. A disposable vacuum type rotary drum filter for separating a liquid containing suspended solids into a filtrate fraction and a filter cake fraction, comprising:
  (a) a housing, said housing including:
    (i) a liquid inlet;
    (ii) a liquid overflow disposed so as to determine a maximum level of the liquid in the housing;
    (iii) a gas inlet;
    (iv) a filter cake outlet; and
    (v) a filtrate outlet adapted to couple to a vacuum source;
  (b) a rotatable filter element rotatably mounted within the housing to rotate through a liquid and through gas contained within the housing, and comprising:
    (i) a filter membrane covering an outer surface of said filter element, said filter membrane being of a porosity selected to prevent said suspended solids from passing through said filter membrane, thereby forming the filter cake on an outer surface of said filter membrane, while enabling said filtrate fraction to pass through said filter membrane, rotation of the rotatable filter element causing the filter cake just deposited on the filter membrane to be exposed to a gas as the filter cake is rotated out of the liquid, gas passing through the filter cake and the filter membrane tending to dry the filter cake; and
    (ii) a plurality of fluid channels in fluid communication with said filtrate outlet and disposed behind the filter membrane to receive the filtrate fraction and gas that has passed therethrough and to convey the filtrate fraction and gas toward said filtrate outlet;
  (c) a driven member connected to the rotatable filter element and adapted to be drivingly coupled to an external prime mover; said driven member causing said rotatable filter element to rotate; and
  (d) means for removing said filter cake from said outer surface of said filter membrane, and to direct any filter cake removed into said filter cake outlet.

40. The disposable vacuum type rotary drum filter of claim 39, wherein said liquid inlet, said liquid overflow, said gas inlet, said filtrate outlet, and said filter cake discharge are integral integrally formed within said housing.

41. The disposable vacuum type rotary drum filter of claim 39, wherein said housing is formed of a material that is chemically compatible with said liquid.

42. The disposable vacuum type rotary drum filter of claim 41, wherein said housing is fabricated from a plurality of parts formed from a plastic material.

43. The disposable vacuum type rotary drum filter of claim 39, wherein said housing further comprises a journal, said journal rotatably supporting said rotatable filter element.

44. The disposable vacuum type rotary drum filter of claim 39, wherein said driven member is integral to said rotatable filter element.

45. The disposable vacuum type rotary drum filter of claim 39, wherein said means to remove said filter cake from said surface of said filter comprises an elongate edge extending adjacent to and spaced apart from said surface of said filter.

46. The disposable vacuum type rotary drum filter of claim 45, wherein said edge is integral to said housing.

47. The disposable vacuum type rotary drum filter of claim 39, wherein said driven member is adapted to magnetically couple with an external prime mover.

48. The disposable vacuum type rotary drum filter of claim 39, wherein said rotatable filter element is generally cylindrical in shape and rotates about its longitudinal axis.

49. The disposable vacuum type rotary drum filter of claim 48, wherein said plurality of fluid channels extend along the rotatable filter element immediately under the filter membrane; and wherein said rotatable filter element further comprises:
  (a) a cavity in fluid communication with said filtrate outlet, said cavity being disposed proximate a center of an end of said rotatable filter element; and
  (b) a plurality of filtrate tubes connecting said plurality of fluid channels in fluid communication with said cavity, thereby conveying the filtrate fraction to said filtrate outlet.

50. The disposable vacuum type rotary drum filter of claim 49, further comprising a plate that separates said cavity into an upper portion and a lower portion, said plate being attached to said housing so that said rotatable filter element is free to rotate about said plate.

51. The disposable vacuum type rotary drum filter of claim 50, further comprising an orifice, said orifice controlling a gas flow through said filter membrane by controlling a pressure differential between said upper portion and said lower portion of said cavity.

52. The disposable vacuum type rotary drum filter of claim 51, wherein gas flows into the housing through the gas inlet to replace gas exiting said housing through said filtrate outlet.

53. The disposable vacuum type rotary drum filter of claim 52, wherein the orifice comprises a pressure control that limits a volume of gas flowing out of the housing to ensure that the filtrate fraction flows out the filtrate outlet.

54. The disposable vacuum type rotary drum filter of claim 53, wherein the plurality of filtrate tubes extend radially, between the cavity and the plurality of fluid channels, around the longitudinal axis of the rotatable filter element.

55. The disposable vacuum type rotary drum filter of claim 54, wherein changing a size of said orifice changes a flow of the filtrate fraction through the filtrate outlet.

* * * * *